United States Patent [19]

Ozaki et al.

[11] Patent Number: 4,524,921
[45] Date of Patent: Jun. 25, 1985

[54] FISHING REEL

[75] Inventors: Kiyomi Ozaki, Fuchu; Kikuo Tsunoda, Hiroshima, both of Japan

[73] Assignee: Ryobi Ltd., Hiroshima, Japan

[21] Appl. No.: 473,231

[22] Filed: Mar. 8, 1983

[30] Foreign Application Priority Data

Mar. 10, 1982 [JP] Japan ................................. 57-33375

[51] Int. Cl.³ ........................ A01K 89/00; G05G 5/06
[52] U.S. Cl. ................................. 242/84.1 J; 74/547
[58] Field of Search .................. 242/84.1 J, 96, 84.8; 74/547, 546, 545

[56] References Cited

U.S. PATENT DOCUMENTS

| | | | |
|---|---|---|---|
| 2,984,433 | 5/1961 | Clark | 242/84.5 R X |
| 3,948,117 | 4/1976 | Kimura | 242/84.1 J X |
| 4,253,618 | 3/1981 | Beraut | 242/84.1 J |
| 4,310,127 | 1/1982 | Yamasaki | 242/84.1 J |
| 4,437,621 | 3/1984 | Sakumoto | 242/84.1 J |

Primary Examiner—Stuart S. Levy
Assistant Examiner—Joseph J. Hail, III
Attorney, Agent, or Firm—Frishauf, Holtz, Goodman & Woodward

[57] ABSTRACT

In a fishing reel of the type wherein a drag knob is arranged near the handle mounting end of a handle shaft journalled on a reel body, a handle arm is pivotally mounted on a bracket secured to and protruded from the front end of the handle shaft. A slide key is slidably mounted on the handle arm so as to engage the bracket thereby locking the handle arm in the erected and folded positions.

3 Claims, 3 Drawing Figures

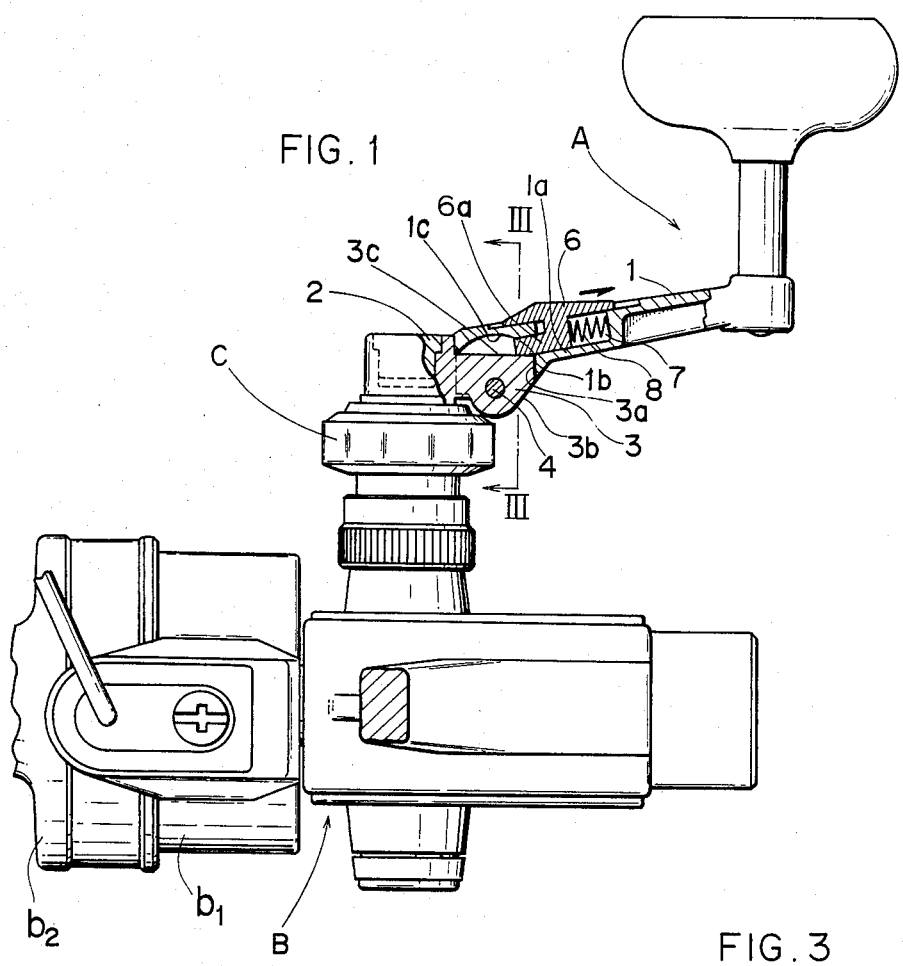
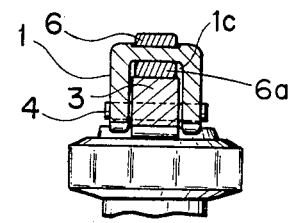
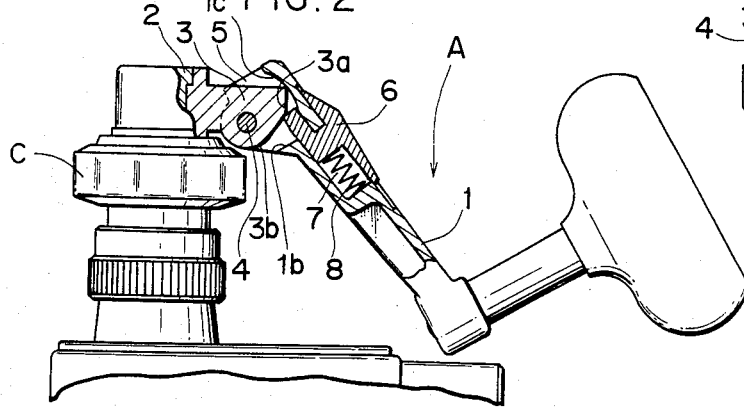

FISHING REEL

BACKGROUND OF THE INVENTION

This invention relates to a fishing reel, and more particularly a handle folding device thereof.

As a prior-art handle folding device, it is disclosed in U.S. Pat. No. 4,310,127 that a handle arm is pivotally mounted on the outer end of a handle shaft to be movable between erected and folded positions, and a slide key is slidably mounted on the lower surface of the handle arm so as to engage the handle shaft for positively locking the handle arm in the erected or folded position. This device is very advantageous as the handle arm can be readily and rapidly folded and erected while preventing loosening of the handle arm during use.

Recently, however, a drag knob for operating a drag mechanism built in a reel body tends to be arranged near the handle mounting end of the handle shaft, and the above device could not be utilized for this type reel since the folding of the handle arm is blocked by a drag knob circumferentially protruding out of the handle shaft.

SUMMARY OF THE INVENTION

Accordingly, it is an object of the invention to provide an improved fishing reel which can eliminate the above disadvantage and can readily fold and erect the handle arm regardless of the position of the drag knob.

According to this invention, there is provided a fishing reel of the type wherein a drag knob is arranged near the handle mounting end of a handle shaft journalled on a reel body, comprising a bracket secured to and protruded in the radial direction from the front end of said handle shaft, the vertically sectional configuration of said bracket comprising a vertically straight part, a downwardly following inclined part and a horizontally extending flat part; a handle arm swingably pivoted to said bracket at the base end thereof and comprising an inverted U-shaped member provided with a lower guide wall at the intermediate portion thereof, the upper inner surface of the base end of said handle arm being arc-shaped for allowing the rotation thereof around the periphery of said bracket and the front end of said lower guide wall being vertically straightly cut to contact and meet with said vertically straight part of the bracket; a locking element carried by the handle arm and movable longitudinally of the arm into a locking state in which it engages selectively the vertically straight part and the horizontally extending part of the bracket, and into a retracted state; and resilient means acting between the handle arm and the locking element to urge the locking element into the locking state.

BRIEF DESCRIPTION OF THE DRAWINGS

In the accompanying drawings:

FIG. 1 is a side view partly in longitudinal section showing the fishing reel embodying the invention wherein the handle is erected;

FIG. 2 is a side view partly in longitudinal section showing the handle folding device of the fishing reel shown in FIG. 1 wherein the handle is folded; and FIG. 3 is a sectional view taken along the line III—III in the FIG. 1.

DESCRIPTION OF THE PREFERRED EMBODIMENTS

As shown in FIG. 1, a handle A is mounted on a handle shaft 2 to rotate a rotor b1 and reciprocatingly move a spool b2 both mounted on a reel body B, and a drag knob C is arranged near the handle mounting end of the handle shaft 2 so as to be rapidly and readily operative during string wind-up operation.

More particularly, a handle arm 1 is pivoted at the base end thereof to a bracket 3 by a pivot pin 4. The bracket 3 is protruded in the radial direction from the front end of the handle shaft and has a sectional configuration parallel to the axis of the handle shaft comprising axially directed part 3a, inclined part 3b radially inwardly following the part 3a, and a flat part 3c, radially extending from the part 3a. Pivot pin 4 is offset from the axis of the handle shaft 2 to enable the handle arm 1 to swing free of the drag knob C.

The handle arm 1 comprises an inverted U-shaped member and a longitudinal slot 7 is formed at a suitable position of the upper wall while a guide wall 1a is provided at the lower portion thereof. The upper inner-periphery 1c of the base end of the handle arm is arc-shaped so that the handle arm 1 is rotated in the clockwise direction in FIG. 1 about the pivot pin 4 along the outer periphery of the bracket 3 having the above-described configuration, while the front end 1b of the guide wall 1a is cut transversely of the handle arm so as to meet the axially directed part 3a of the bracket 3 and contact it when the handle A is erected.

A slide button 6 is slidably received in the slot 7 and urged toward the left as viewed in FIG. 1 by a spring 8 inserted in the slot 7, and a bent leg 6a of the slide button 6 is guided by the guide wall 1a. When the handle A is erected, the front end of the bent leg 6a is inserted as a wedge into the space between the arc-shaped inner periphery 1c of the handle arm 1 and the flat part 3c of the bracket 3 so as to securely hold the handle arm 1 in its erected position by preventing the rotation thereof.

To fold the handle A from the erected position shown in FIG. 1, the slide button 6 is moved toward the right as viewed in FIG. 1 against the force of the spring 8 until the front end of the bent leg 6a is positioned behind the front end 1b of the guide wall 1a, and then the handle arm 1 is rotated in the clockwise direction about the pivot pin 4 to the position shown in FIG. 2 where the top edge of the vertically straight part 3a of the bracket 3 contacts the arc-shaped inner periphery 1c of the handle arm 1. Thereafter, the button 6 is released so that the front end of the bent leg 6a is engaged with the inclined part 3b of the bracket 3, thus securely holding the handle arm 1 in the folded position.

To erect the handle A from the folded position shown in FIG. 2, the button 6 is moved toward the right to disengage the front end of the bent leg 6a from the bracket 3. Consequently, the handle arm 1 is rotated in the counter-clockwise direction to the position shown in FIG. 1 where the front end 1b of the guide wall 1a contacts the axially directed part 3a of the bracket 3. In this position the slide button 6 is released to move into a wedging position between the handle arm 1 and the bracket 3, thus securely holding the handle arm in the erected position.

As above described, according to the invention, the handle is readily folded regardless of the position of the drag knob since the pivot point and the rotary center of the handle is shifted by the bracket mounted on the handle shaft.

Although the invention has been described in terms of a preferred embodiment thereof, it should be understood that the invention is by no means limited thereto but many changes and modifications may be made without departing from the true spirit and scope of the invention as defined in the appended claims.

What is claimed is:

1. In a fishing reel having a drag knob arranged near a handle mounting end of a handle shaft journalled on a reel body, the handle shaft having a front end to which a handle is mounted, the improvement comprising:

a bracket secured to and protruded from said front end of said handle shaft and extending substantially in the radial direction of said handle shaft, said bracket having an axially parallel sectional configuration comprising an axially directed part directed axially of said handle shaft, an inwardly inclined following part directed radially inwardly relative to said handle shaft, and a flat part extending radially relative to said handle shaft;

a handle arm having a base end portion, said base end portion being swingably pivoted to said bracket, said base end portion of said handle arm comprising an inverted U-shaped member provided with a lower guide wall at an intermediate portion thereof, said base end portion having an arc shaped upper inner surface which engages a peripheral portion of said bracket for rotation thereof around said peripheral portion of said bracket, and said lower guide wall having a front end having a cut therein transversely of said handle arm to contact and meet with said axially directed part of said bracket;

a locking element coupled to said handle arm and having an engagement portion, said locking element being selectively movable longitudinally of said handle arm between (i) a locking state in which said engagement portion engages said inclined following part and said radially extending flat part of said bracket and (ii) a retracted state in which said engagement portion is out of engagement with said inclined following part and said radially extending flat part of said bracket; and resilient means coupled between said handle arm and said locking element for urging said locking element toward its said locking state.

2. The fishing reel of claim 1, including pivot means on said bracket for pivotally mounting said handle arm on said handle shaft, said pivot means defining a pivot axis offset from said axis of said handle shaft for enabling swinging movement of said handle arm about said pivot axis free of the drag knob.

3. The fishing reel of claim 2, wherein said handle arm extends substantially in a direction perpendicular to said pivot axis of said pivot means.

* * * * *